April 13, 1965    L. BENOIT    3,177,606
FISHING TACKLE DROPAWAY SINKER
Filed Sept. 29, 1961
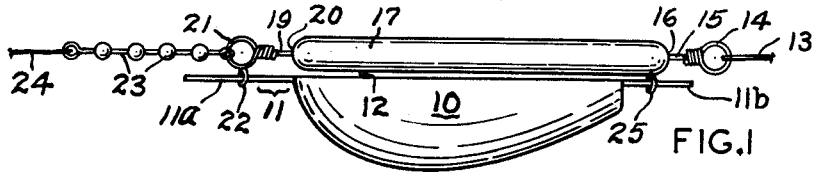
FIG.1
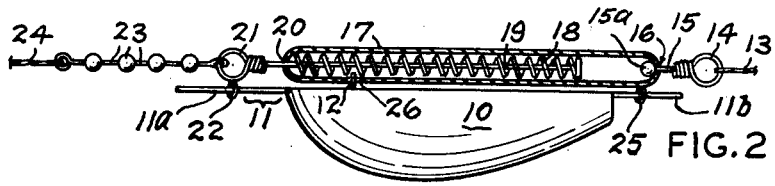
FIG.2
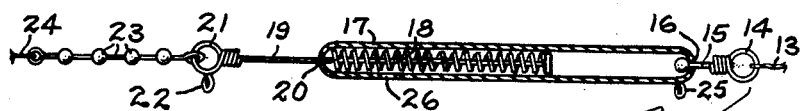
FIG.3
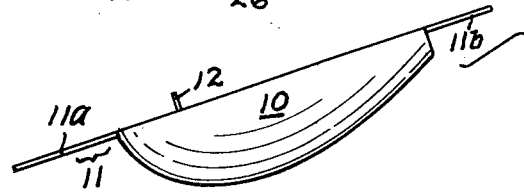
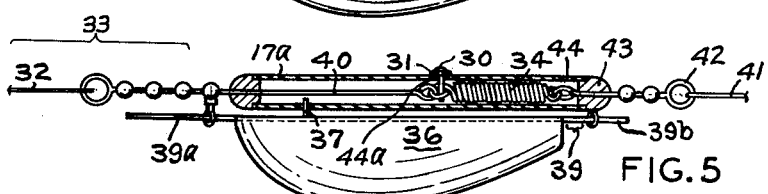
FIG.4
FIG.5
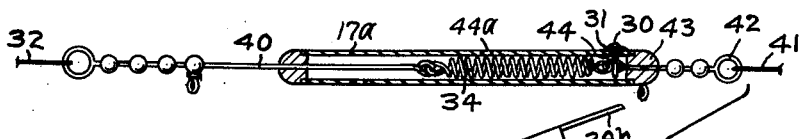
FIG.6
FIG.7
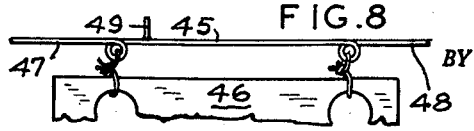
FIG.8
INVENTOR.
Louis Benoit
BY
ATTORNEY

United States Patent Office 3,177,606
Patented Apr. 13, 1965

3,177,606
FISHING TACKLE DROPAWAY SINKER
Louis Benoit, 320 Miller Bldg., Yakima, Wash.
Filed Sept. 29, 1961, Ser. No. 141,652
9 Claims. (Cl. 43—43.12)

My invention relates to a fishing tackle-dropaway sinker.

More particularly, my invention relates to a sinker for a fish line which has an attachment of such design that a desired degree of pull on the line by a fish will automatically release the sinker and thereby provide for the playing of the hooked fish free of the load of the sinker. This releasing of the sinker from the line increases the contest in landing the fish because the fish does not then have to use its strength to drag around the heavy sinker. The strength of the fish is thus available to fight to get free and gives the fishermen an experience akin to that of dry fly fishing.

In catching some fish there is required several ounces of lead in order to take the fishing line and lure to low enough depths against the undercurrent in the sea to reach the fish. Especially is this true in trolling. When hooked, this heavy weight which may be 3 to 16 ounces or more, puts a heavy load onto the fish and causes it to tire more quickly than if the sinker were to be released after performing its function of taking the hook and lure to the depth required to reach the area occupied by the fish. Furthermore, having the lead removed prevents a possible heavy jerk on the line which may tear the hook free and release the fish due to the inertia of the heavy lead sinker which is necessarily within a few feet of the lure. By having a sinker released soon after hooking the fish this possibility of the fish getting loose is avoided in great measure. My invention thus provides the fish with more freedom in fighting to escape and also protects the fisherman against such escape due to the removal of the heavy dragload of a sinker.

However, it is important to have the equipment so operate as to minimize releasing the sinker unintentionally as when a line is employed in casting. Also there are occasions when it is desirable not to have the sinker releasable and this requires providing an optional application at the will of the fisherman of a locking means to the equipment which prevents the automatic release of the sinker.

At the same time, the releasing of the sinker imposes on the fisherman the requirement of having a delicate touch in letting the fish run with the line while at the same time of keeping the line taut.

One of my objects is to transform or render trolling with heavy equipment necessary to take the lure to depths required to reach the fish as near as possible like the greatly favored fly-type of fishing. In doing this I employ the heavy part as the sinker of a character which may be eliminated while playing the fish, i.e., after the fish is hooked.

The various objects and purposes of my invention are to provide a fishline mechanism which meets and provides for all of the above requirements.

The above specified objects of my invention together with others inherent in the same are attained by the mechanism illustrated in the following drawings, the same being preferred exemplary forms of embodiment of my invention, throughout which drawings like reference numerals indicate and identify like parts:

FIGURE 1 shows the device embodying my invention in assembled form attached to the fishing line and in position for use in fishing;

FIG. 2 is a view in longitudinal section of the upper end of the said device;

FIG. 3 is a longitudinal view similar to FIG. 2 but showing the device in operation with the sinker released, i.e., in dropaway position with respect to the fishing line;

FIG. 4 is a view in side elevation of a modified form of my invention having a locking means therefor to prevent the release of the sinker;

FIG. 5 is a side view with the cylinder shown in section of the modified form with part of cylinder broken away showing the inside parts of the invention and with the locking pin in locked position;

FIG. 6 is a longitudinal view similar to FIG. 5 of the modified form of my invention in side elevation showing the device in operation with the sinker released, i.e., in dropaway position with respect to the fishing line; and FIG. 7 is a separate view in perspective of the locking pin and connected cover or mounting band means.

FIG. 8 is a fragmentary side view of the top edge of a modified form of the invention illustrating how it is adapted to employ a homemade sinker.

The specially designed fishing line sinker member 10 is provided with lure mounting engaging sinker rod or wire 11 fixedly mounted along its upper edge or attached along its upper edge and a short holding pin 12 fixedly disposed in said sinker or said wire. The rod has projecting ends 11a and 11b. This sinker 10 is secured to the fishing line 13 as follows: a swivel member 14 is mounted by a wire portion 15 disposed in an opening 16 in the end of the hollow cylinder 17. Ball 15a secured on the end of wire 15 makes a swivel mounting in opening 16. A spring 18 is enclosed in said cylinder 17 mounted on a rod 19 which extends through an opening 20 in the lure wire end of the cylinder 17 and has a swivel eye 21 which in turn preferably has fixedly mounted ring 22 disposed at right angles to the plane of the eye 21. The eye 21 is provided with a series of swivels 23 which are attached to the leader or lure end 24 of the fishing line.

The cylinder 17 also has a ring 25 cooperating with ring 22 in forming a mounting means for the ends 11a and 11b of the sinker rod 11. End 11a in operating assembly position, i.e. with spring not compressed, extends through ring 22 and end 11b extends through ring 25.

Rod 19 in FIGS. 1, 2 and 3 is secured to the forward end, i.e., reel end, FIGS. 2 and 3, of spring 18. When the fish is caught and pulls on section 24 to which section the hook is connected, a desired pull of the fish will compress the spring 18 and thereby pull the ring 22 free of the sinker rod end portion 11a, as seen in FIG. 3 and this in turn will allow the end portion 11b to slide out of the ring 25 as the forward or leader or lure end of the sinker drops downwardly thereby completing the releasing of the sinker from the fishing line.

Sometimes it may be desired to interrupt employing the fishing line in a trolling operation and use it temporarily for casting before returning to trolling. Under such circumstances, it is important to prevent the sinker from becoming unintentionally freed from the fishing line when the line is cast. The short holding pin 12 extending when in holding position through the opening 26 in the cylinder 17 will not allow the sinker rod 11 to move forwardly or rearwardly in response to the inertia of the sinker due to the casting force, and therefore the end 11a or the end 11b will not become free of the forward ring 22 or rearward ring 25 respectively.

In the modified form shown in FIGS. 4, 5 and 6 a spring locking means comprising a pin 30 and a covering member or holding band 31 are combined in the manner shown in FIG. 7. The end 32 of the leader line is connected to the front (lure) end of the spring 34 (replacing spring 18 of form in FIGS. 1, 2 and 3). That is, this modified form shown in FIGS. 4, 5 and 6 has a pin 30 engageable with spring 34 through opening 44a in cylinder 17a.

I find from actual experimenting that it is advantageous to have the forward (lure) end of the sinker member released first because there appears to be less danger of entanglement and the sinker member frees itself more readily.

This connection with the spring provides for utilizing the full resiliency of the spring. In the case of spring 18, the connection with the reel end of the spring 18 permits each loop of the spring spirals to gradually approach and contact the loop next ahead. In the form shown FIGS. 4, 5, 6 and 7 this does not take place and the full resiliency of the spring 34 is available. This spring 34 operates more smoothly and efficiently than a spring 18 type. In FIG. 7 the pin 30 is shown separately with its band or holding mounting member 31.

In this modified form of the device there is also shown a spring locking mechanism comprising the pin 30 and a cover or band member 31 therefor. By inserting this pin 30 through hole 44a in cylinder 17a shown in FIG. 5, the spring mechanism is rendered completely inoperative. Cylinder 17a has two holes, one for locked position 44a and one 44 for unlocked position as illustrated by pin 30 in position in FIG. 6. The cover member 31 for the pin 30 holds the pin 30 in place and the lateral members of the cover resiliently grip the sides of the cylinder 17a in securing the cover 31 thereto. The sinker is identical or substantially similar to the sinker member 10. In the form of FIGS. 4, 5 and 6 pin 37 is similar to pin 12 of FIGS. 1, 2 and 3 in construction and function. The mounting rod or wire 39 for the sinker is secured along the upper edge of the sinker by "leading on" when the top edge portion of the sinker 36 is in melted form as when being cast and with extensions of the ends 39a (lure end) and 39b (reel end). The wire rod 40 is attached to the front end of the spring 34 (the lure end) 32 of the fishing line. The reel end of the fishing line 41 is connected to the ring 42 which is mounted in the end 43 of the cylinder 17a, as shown in FIG. 6.

When it is desired not to lock the spring the pin 30 may be positioned through an opening 44 in the cylinder. This permits the balance of the spring 34 to be pulled forwardly and its full resiliency employed. Also the locking pin 30 and cover 31 thus are conveniently secured against loss and are ready for use when desired.

At times it may be desirable to use scrap metal for a sinker rather than a preformed lead member and to this end I form as a separate member the wire 45 to extend along the top of a makeshift sinker member 46 said wire being of a length to provide extensions 47 and 48 and also provided with the holding pin 49 welded to the wire as shown in FIG. 8. These parts are similar to the corresponding of the sinker parts of the devices shown in the previous figures.

I claim:

1. A fish line releasing and drop-away sinker mechanism comprising a fish line having a reel and a lure end portion, said fish line having a sinker with a sinker rod fixedly secured along its top edge and characterized by having sinker rod extensions projecting beyond the ends of said sinker which extensions function as slidable releasing means; a cylinder with an opening at the lure and reel ends thereof; a coiled spring disposed in said cylinder; the reel end of the fishing line being secured to said cylinder; a line connector wire operatively connected to said coiled spring; a swivel means secured to said line connector wire, the lure end of the fishing line being connected to said connector wire; a first dependent ring secured transversely of said swivel means at the lure end of the wire and adapted to slidably receive one sinker rod extension; and a second dependent ring secured to said cylinder and adapted to receive slidably the sinker rod extension at the reel end of said sinker whereby a sudden jerk of a predetermined magnitude will pull the first dependent ring free of the lure end of the said sinker rod allowing that end of the sinker to drop downwardly and free of the first dependent ring and allowing the sinker to slide free of the second dependent ring thereby freeing the line of said sinker permitting it to drop away.

2. A fish line releasing and drop-away sinker mechanism comprising, a fish line having a reel and lure end portions, the lure end portion carrying a first ring; a cylinder with an opening at its lure and reel ends; a sinker having a sinker rod fixedly secured along its top edge with sinker rod extensions rectilinearly projecting beyond the ends of said sinker; a coil spring disposed in said cylinder; line connecting means extending through said openings in said cylinder securing said spring intermediate said fish line lure and reel portions; and a second ring carried by the reel end of said cylinder, said ring, together with said first ring, being adapted to normally receive the sinker rod extensions whereby a sudden jerk of a predetermined magnitude on the lure end of the line will pull said first dependent ring of the lure end free of the said sinker extension allowing that end to drop downwardly and free of the first dependent ring, and then allowing the other sinker rod extension to slide free of the second dependent ring thereby entirely freeing the line of said sinker.

3. A fish line sinker releasing and drop-away mechanism comprising a fish line having a reel and lure end portions; a cylinder with an opening at its lure and reel ends portions; a connector wire extending through said reel end opening and secured to an end of said fish line; a sinker having a sinker rod fixedly secured along its top edge with sinker rod extensions rectilinearly projecting beyond the ends of said sinker; a coiled spring disposed in said cylinder and bearing against one end portion of said cylinder and having a connector wire extending through said spring and secured to the reel end of said spring, said connector wire extending through the lure end of said cylinder; a swivel means secured to the lure end of said connector wire beyond the end of said cylinder; a fixed dependent ring secured to the said swivel means disposed transversely of the line adapted to slidably receive one of said sinker extensions; a second dependent ring secured to said cylinder and adapted to slidably receive the reel end of said sinker extension; whereby a sudden jerk of a predetermined magnitude on the lure end of the line will pull the said first dependent ring of the lure end free of the said sinker extension allowing that end to drop downwardly and free of the first dependent ring and then allowing the reel end sinker rod extension to slide free of the second dependent ring thereby entirely freeing the line of said sinker.

4. A fish line releasing and drop-away sinker mechanism comprising, a fish line having a reel and lure end portions, the lure end portion carrying a first ring; a cylinder with an opening at its lure and reel ends; a sinker having a sinker rod fixedly secured along its top edge with sinker rod extensions rectilinearly projecting beyond the ends of said sinker; and a short holding pin vertically rigidly disposed on the upper edge portion of said sinker and slidably engageable through a hole in said cylinder; a coil spring disposed in said cylinder; connecting means extending through said openings in said cylinder securing said spring intermediate said fish line lure and reel portions and a second ring carried by the reel end of said cylinder, said ring, together with said first ring being adapted to normally receive the sinker rod extensions whereby a sudden jerk of a predetermined magnitude on the lure end of the line will pull said first dependent ring of the lure end free of the said sinker extension allowing that end to drop downwardly and free of the first dependent ring and then allowing the other sinker rod extension to slide free of the second dependent ring thereby entirely freeing the line of said sinker.

5. In a fish line sinker automatic releasing mechanism; a cylinder having lure and reel ends; a spring mounted in said cylinder; a sinker; a sinker rod mounted along the upper edge of said sinker, said rod having relatively short straight bare extensions beyond each end of said sinker; a ring fixed adjacent the lure end of said cylinder and a ring fixed to the cylinder on the reel end thereof of said cylinder, said rings receiving the bare extensions of said rod of said sinker for releasing said sinker when a desired pull is exerted on said line; and a short holding pin vertically disposed on the said upper edge of said sinker when said extensions are engaged in said rings, said pin being engageable with said cylinder whereby said sinker is held by said cylinder until a desired pull is made on said line.

6. In a fish line sinker automatic releasing mechanism, a fish line having a reel and lure end portions; a spring disposed between the lure and reel end portions joining the two portions; a mounting cylinder for said spring; a ring carried by said lure end portion adjacent the spring; a ring carried by said cylinder in its reel end portion; a sinker element of an oblong and streamlined form having an upper edge portion and a rod mounting along said upper edge, said rod extending rectilinearly beyond the ends of said sinker, said rod extensions being engageable by said rings; said rod extensions being releasable from said rings by expanding said spring.

7. The combination of claim 3 further comprising a locking means for said coil spring comprising means in said cylinder providing a hole in order to releasably hold a pin selectively engageable with said spring in locking the same against longitudinal expansion.

8. In a fish line sinker releasable and dropaway mechanism, a sinker element of oblong form having an upper edge portion and having a lure end attaching portion and a reel end attaching end portion; a sinker rod fixedly secured along said upper edge of said element and characterized by having sinker rod extensions rectilinearly projecting beyond the said ends of said sinker; and a short holding pin vertically rigidly disposed on said upper edge portion of said sinker.

9. In a releasing and dropaway mechanism for a fish line sinker, a sinker mounting means comprising, a fish line having a lure and reel end portions; a cylinder; a spring in said cylinder joining said lure and reel end portions of said line; a sinker of oblong form with an upper edge; a rod fixedly secured in said upper edge, the end portions of said rod projecting rectilinearly beyond the ends of said sinker, the lure end of said cylinder carrying a first ring and a second ring carried by the reel end thereof, said rings being adapted to normally receive the sinker rod extensions whereby a sudden jerk of predetermined magnitude on the lure end of the line will pull said first ring free of the said sinker extensions allowing said ring to drop downwardly and free of the first ring and then allowing the other sinker end extension to slide free of the second ring thereby entirely freeing the line of said sinker; a short holding pin disposed uprightly in the said upper edge of said sinker, said cylinder having a hole in registry with said holding pin in order to releasably hold the same when said extensions are engaged by said rings; a locking pin for said spring receivable in a hole in said cylinder for locking the spring against extension as when the mechanism is used for casting.

References Cited by the Examiner

UNITED STATES PATENTS

| | | | |
|---|---|---|---|
| 2,217,972 | 10/40 | Smith | 43—44.88 |
| 2,562,054 | 7/51 | Mathieu | 43—43.12 |
| 2,858,637 | 11/58 | Stark | 43—43.12 |
| 2,994,622 | 8/61 | Miller | 43—43.12 X |

FOREIGN PATENTS 161,918  7/07  Great Britain.

ABRAHAM G. STONE, *Primary Examiner.*

JOSEPH S. REICH, *Examiner.*